(12) United States Patent
Wang et al.

(10) Patent No.: US 10,805,229 B2
(45) Date of Patent: Oct. 13, 2020

(54) GENERATING, AT LEAST IN PART, AND/OR RECEIVING, AT LEAST IN PART, AT LEAST ONE REQUEST

(71) Applicant: Intel Corporation, Santa Clara, CA (US)

(72) Inventors: Ren Wang, Portland, OR (US); Tsung-Yuan Charles Tai, Portland, OR (US); Jr-Shian Tsai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/410,442

(22) Filed: May 13, 2019

(65) Prior Publication Data

US 2019/0268280 A1  Aug. 29, 2019

Related U.S. Application Data

(60) Division of application No. 13/540,246, filed on Jul. 2, 2012, now Pat. No. 10,291,542, which is a (Continued)

(51) Int. Cl.
| | |
|---|---|
| *H04L 12/925* | (2013.01) |
| *H04L 12/911* | (2013.01) |
| *H04N 1/333* | (2006.01) |
| *H04L 1/18* | (2006.01) |
| *H04L 12/835* | (2013.01) |

(Continued)

(52) U.S. Cl.
CPC .......... *H04L 47/748* (2013.01); *H04L 1/1835* (2013.01); *H04L 12/12* (2013.01); *H04L 47/30* (2013.01); *H04L 47/722* (2013.01); *H04L 67/125* (2013.01); *H04N 1/33376* (2013.01); *H04L 67/2861* (2013.01); *Y02D 50/40* (2018.01); *Y02D 50/42* (2018.01)

(58) Field of Classification Search
CPC ..... H04L 1/0053; H04L 1/1835; H04L 47/30; H04L 47/722; H04W 52/00; H04W 52/0219

See application file for complete search history.

(56) References Cited

U.S. PATENT DOCUMENTS

| | | | |
|---|---|---|---|
| 2002/0004840 A1* | 1/2002 | Harumoto ............ | H04N 21/658 709/231 |
| 2005/0018624 A1* | 1/2005 | Meier .................... | H04L 1/1664 370/318 |

(Continued)

*Primary Examiner* — Salvador E Rivas
(74) *Attorney, Agent, or Firm* — Barnes & Thornburg LLP

(57) ABSTRACT

In an embodiment, an apparatus is provided that may include circuitry to generate, at least in part, and/or receive, at least in part, at least one request that at least one network node generate, at least in part, information. The information may be to permit selection, at least in part, of (1) at least one power consumption state of the at least one network node, and (2) at least one time period. The at least one time period may be to elapse, after receipt by at least one other network node of at least one packet, prior to requesting at least one change in the at least one power consumption state. The at least one packet may be to be transmitted to the at least one network node. Of course, many alternatives, modifications, and variations are possible without departing from this embodiment.

17 Claims, 3 Drawing Sheets

Related U.S. Application Data continuation of application No. 12/210,016, filed on Sep. 12, 2008, now Pat. No. 8,213,303.

(51) Int. Cl.
*H04L 12/12* (2006.01)
*H04L 29/08* (2006.01)

(56) References Cited

U.S. PATENT DOCUMENTS

| | | | |
|---|---|---|---|
| 2005/0208958 A1* | 9/2005 | Bahl | H04W 52/0216 455/509 |
| 2006/0239282 A1* | 10/2006 | Dick | H04L 12/56 370/401 |
| 2009/0034479 A1* | 2/2009 | Wakayama | H04L 45/16 370/332 |
| 2009/0049320 A1* | 2/2009 | Dawkins | G06F 1/3268 713/324 |
| 2009/0225792 A1* | 9/2009 | Benjes | H04N 21/64315 370/537 |

* cited by examiner

GENERATING, AT LEAST IN PART, AND/OR RECEIVING, AT LEAST IN PART, AT LEAST ONE REQUEST

CROSS-REFERENCE TO RELATED APPLICATIONS

This application is a divisional of U.S. patent application Ser. No. 13/540,246, filed on Jul. 2, 2012, which is a continuation of U.S. patent application Ser. No. 12/210,016 filed on Sep. 12, 2008, now U.S. Pat. No. 8,213,303. These applications are herein incorporated by reference in its entirety.

FIELD

This disclosure relates to generating, at least in part, and/or receiving, at least in part, at least one request.

BACKGROUND

In one conventional network arrangement, computers are coupled together via communication media. In order to reduce power consumption, during periods of inactivity or reduced activity, the computers may be powered off, or enter low power modes of operation (e.g., "sleep" modes) in which various resources (e.g., network interfaces, monitors, etc.) may be powered off. Typically, decisions whether to power off or enter such low power modes of operation are separately made by each individual computer in the network, and do not involve or contemplate coordination or collaboration among the individual computers. Disadvantageously, this reduces the effectiveness of power management in the network, and increases the likelihood that data transmitted between or among computers in the network will be lost (e.g., as a result of the intended recipient being powered off or in a mode of operation in which the recipient cannot receive the data).

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
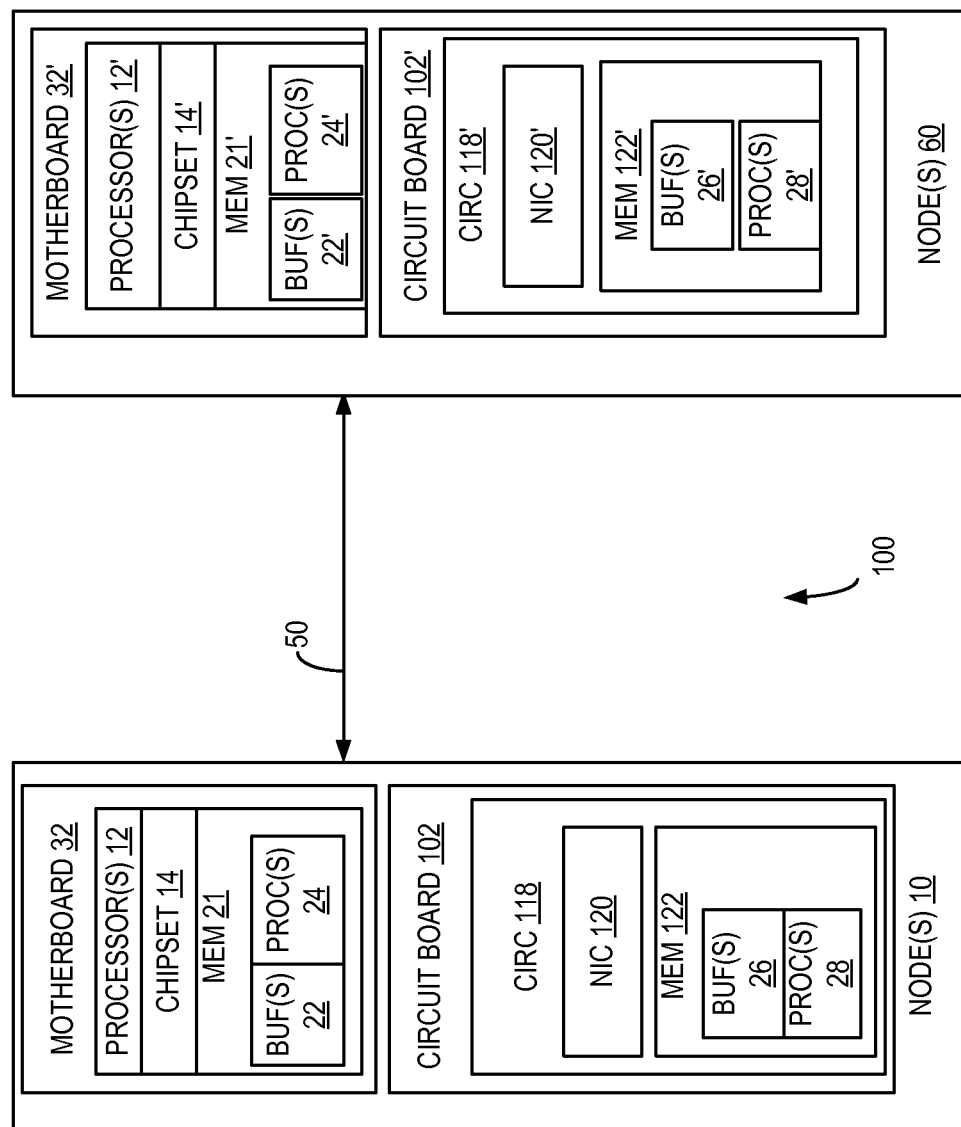
FIG. 1 illustrates a system embodiment.

FIG. 1 illustrates a system embodiment 100. System 100 may include one or more network nodes 10 that may be communicatively coupled via one or more communication links 50 to one or more other network nodes 60. In this embodiment, a "network node" or "node" may be used interchangeably to mean an entity communicatively coupled in and/or to a network, such as, for example, an end station, intermediate station, network interface, and/or portion thereof. In this embodiment, a "network" may be or comprise two or more nodes that are communicatively coupled together. Also in this embodiment, a node may be "communicatively coupled" to another node if the one node is capable of transmitting to and/or receiving from the other node one or more packets. As used herein, a "packet" may comprise one or more symbols and/or values.

In this embodiment, one or more nodes 10 and/or one or more nodes 60 may comprise one or more respective host computer systems. For example, in this embodiment, as shown in FIG. 1, one or more nodes 10 may comprise circuit board 102 and motherboard 32. Motherboard 32 may comprise one or more host processors 12. Each of the host processors 12 may be coupled (e.g., via a respective not shown segment of a proprietary bus) to a chipset 14. Each of the one or more host processors 12 may comprise, for example, a respective Intel® Core™ 2 VPro™ microprocessor that is commercially available from the Assignee of the subject application. As used herein, a "processor" means circuitry capable of performing, at least in part, one or more arithmetic and/or logical operations. Of course, alternatively, each of the host processors 12 may comprise, for example, a respective microprocessor that is manufactured and/or commercially available from a source other than the Assignee of the subject application, without departing from this embodiment.

Chipset 14 may comprise a not shown memory controller hub that may couple one or more host processors 12, a system memory 21 and a not shown user interface system to each other and to a not shown bus system. Chipset 14 may comprise one or more integrated circuit chips selected from, for example, one or more integrated circuit chipsets available from the Assignee of the subject application (e.g., memory controller hub and I/O controller hub chipsets), although one or more other integrated circuit chips may also, or alternatively be used, without departing from this embodiment. The not shown user interface system may comprise, e.g., a keyboard, pointing device, and display system that may permit a human user to input commands to, and monitor the operation of, system 100. The not shown bus system may comprise one or more buses that may comply with the bus protocol described in Peripheral Component Interconnect (PCI) Express™ Base Specification Revision 1.0, published Jul. 22, 2002, available from the PCI Special Interest Group, Portland, Oreg., U.S.A. Alternatively, the bus may comprise other types of bus systems, without departing from this embodiment.

Circuit card 102 in one or more nodes 10 may be communicatively coupled to circuit card 102' in one or more nodes 60 via links 50. Circuit card 102 may comprise operative circuitry 118. Operative circuitry 118 may comprise network interface controller (NIC) 120 and memory 122.

Processors 12, system memory 21, and chipset 14 may be comprised in a single circuit board, such as, for example, system motherboard 32. Motherboard 32 also may comprise the not shown bus system and a not shown bus card slot. Card 102 may include a not shown bus connector that may be capable of being electrically and mechanically coupled to the bus card slot that may be comprised in the motherboard 32. When the bus connector of card 102 is so coupled to the bus card slot comprised in motherboard 32, operative circuitry 118 may become communicatively coupled to motherboard 32.

Alternatively, without departing from this embodiment, some or all of the operative circuitry 118 of card 102 may not be comprised in card 102, but instead, may be comprised in other structures, systems, and/or devices. These other structures, systems, and/or devices may be, for example, comprised in motherboard 32 (e.g., as part of host processor 12 and/or chipset 14).

One or more machine-readable program instructions may be stored in computer-readable/writable memory 122 and/or 21. In operation of one or more nodes 10, these instructions may be accessed and executed by NIC 120 and/or one or more host processors 12. When executed by NIC 120 and/or one or more host processors 12, these one or more instructions may result in NIC 120, operative circuitry 118, host processor 12, and/or card 102 performing the operations described herein as being performed by NIC 120, operative circuitry 118, host processor 12, and/or card 102. Also when executed by NIC 120 and/or one or more host processors 12, these one or more instructions may result in one or more program processes 24 and/or 28 being executed, at least in part, by NIC 120, operative circuitry 118, and/or one or more host processors 12. Computer-readable/writable memory 21 and 122 may each comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory. Memory 21 and/or 122 may comprise one or more buffers 22 and/or 26.

One or more nodes 60 may comprise motherboard 32' and circuit board 102' whose construction may conform, in whole or in part, to the construction of motherboard 32 and circuit board 102, respectively. Thus, motherboard 32' may comprise one or more host processors 12', chipset 14', and memory 21' whose construction may conform, in whole or in part, to the construction of one or more host processors 12', chipset 14', and memory 21'. Additionally, circuit board 102' may comprise operative circuitry 118' whose construction may conform, in whole or in part, to the construction of circuitry 118. Circuitry 118' may comprise NIC 120' and memory 122' whose construction may conform, in whole or in part, to the construction of NIC 120 and memory 122. Circuit board 102' and circuitry 118' may be communicatively coupled via one or more links 50 to circuit board 102 and circuitry 118.

One or more machine-readable program instructions may be stored in computer-readable memory (not shown) in circuitry 118'. In operation of one or more nodes 60, these instructions may be accessed and executed by computer-readable/writable memory 122' and/or 21'. In operation of one or more nodes 60, these instructions may be accessed and executed by NIC 120' and/or one or more host processors 12'. When executed by NIC 120' and/or one or more host processors 12', these one or more instructions may result in NIC 120', operative circuitry 118', one or more host processors 12', and/or card 102' performing the operations described herein as being performed by NIC 120', operative circuitry 118', one or more host processors 12', and/or card 102'. Also when executed by NIC 120' and/or one or more host processors 12', these one or more instructions may result in one or more program processes 24' and/or 28' being executed, at least in part, by NIC 120', operative circuitry 118', and/or one or more host processors 12'. Computer-readable/writable memory 21' and 122' may each comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory. Memory 21' and/or 122' may comprise one or more buffers 22' and/or 26'.

One or more communication links 50 may be compatible with one or more communication protocols, and circuitry 118 in one or more nodes 10 may exchange data and/or commands with circuitry 118' in one or more nodes 60 via links 50, in accordance with these one or more communication protocols. For example, in this embodiment, one or more links 50 may be compatible with, and the respective operative circuitry 118 may exchange data and/or commands with circuitry 118' in accordance with, e.g., an Ethernet protocol and/or Transmission Control Protocol/Internet Protocol (TCP/IP) protocol.

The Ethernet protocol utilized in system 100 may comply or be compatible with the protocol described in Institute of Electrical and Electronics Engineers, Inc. (IEEE) Std. 802.3, 2000 Edition, published on Oct. 20, 2000. Alternatively or additionally, the TCP/IP protocol utilized in system 100 may comply or be compatible with the protocols described in Internet Engineering Task Force (IETF) Request For Comments (RFC) 791 and 793, published September 1981. Of course, many different communication protocols may be used for such data and/or command exchange without departing from this embodiment.

Figure 2:
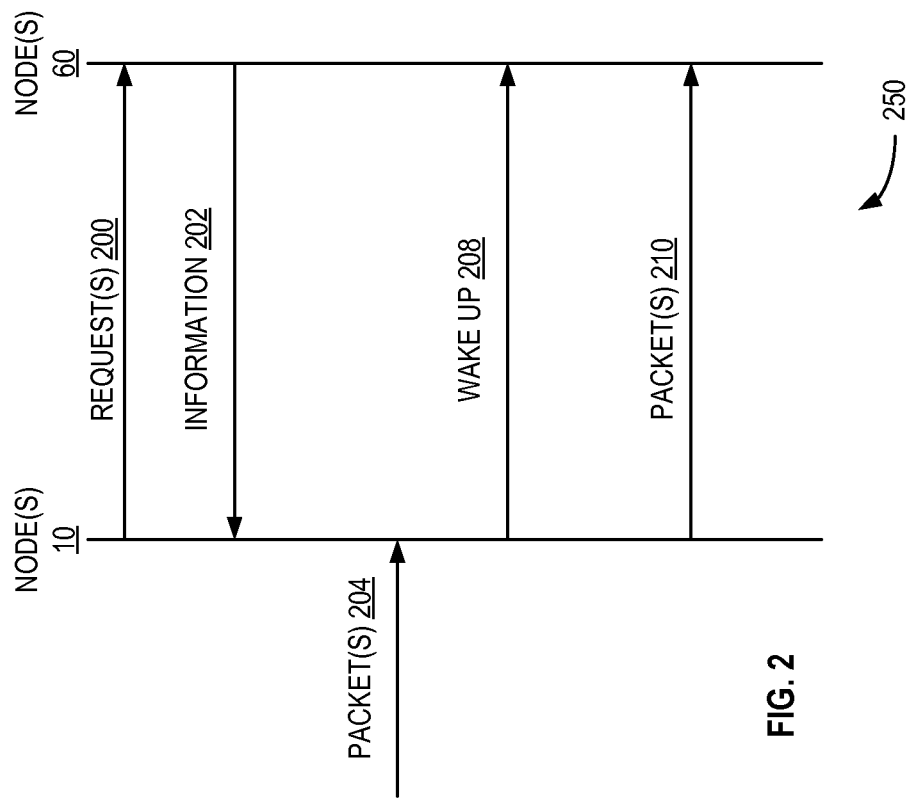
FIG. 2 illustrates transmissions that may take place in the system embodiment of FIG. 1.
Figure 3:
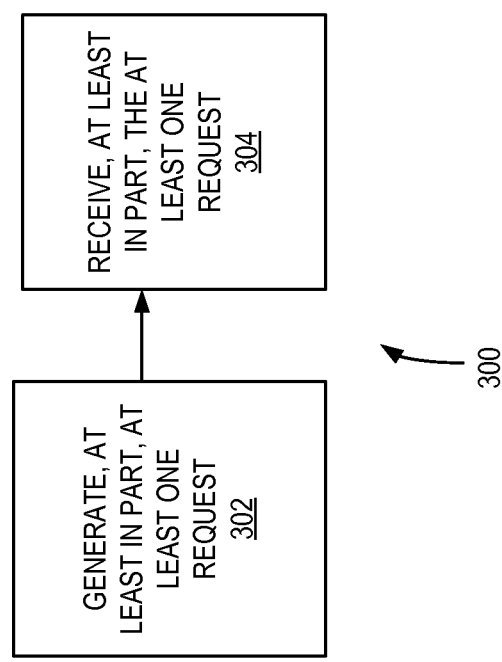
FIG. 3 illustrates operations that may be performed according to an embodiment.

With reference now being made to FIGS. 1 to 3, transmissions 250 (see FIG. 2) that may occur, and operations 300 (see FIG. 3) that may be performed in system 100 according to an embodiment will be described. After, for example, a reset of system 100, one or more processes 24 and/or 28 may signal one or more processors 12, circuitry 118, and/or NIC 120. In this embodiment, this may result in one or more processors 12, circuitry 118, and/or NIC 120 initiating, at least in part, negotiation and/or exchange, at least in part, between at least one node 10 and at least one node 60 (via one or more links 50) of one or more parameters defining, related to, enabling, and/or facilitating, at least in part, entry of at least one node 60 into at least one relatively lower power consumption state relative to a present relatively higher power consumption state of at least one node 60. For example, this negotiation may comprise generation, at least in part, by one or more processors 12, circuitry 118, and/or NIC 120 of at least one request 200 (as illustrated by operation 302 in FIG. 3, and transmission, at least in part, via one or more links 50 of the at least one request 200 to at least one node 60. The at least one request 200 may request, at least in part, that at least one node 60 generate, at least in part, information 202 to be used by the at least one node 10 and/or at least one node 60. The information 202 may permit the selection, at least in part, of (1) the at least one relatively lower power consumption state of at least one node 60 and (2) at least one time period to elapse, after receipt by the at least one node 10 of at least one packet 204 (intended to be transmitted to the at least one node 60), prior to requesting that the at least one node 60 change at least one power consumption state of the at least one node 60.

After the at least one request 200 has been transmitted, at least in part, via the one or more links 50, to at least one node 60, one or more processors 12', circuitry 118', and/or NIC 120' may receive, at least in part, the at least one request 200, as illustrated by operation 304 in FIG. 3. This may result, at least in part, in one or more processes 24' and/or 28' signaling one or more processors 12', circuitry 118', and/or NIC 120'. This may result, at least in part, in one or more processors 12', circuitry 118', and/or NIC 120' generating, at least in part, information 202.

For example, in this embodiment, as part of this generation, at least in part, of information 202, one or more processors 12', circuitry 118', and/or NIC 120' may determine, at least in part, packet buffering capability of at least one node 10 and/or packet buffering capability of at least one node 60 that may be employed while at least one node 60 is in the relatively lower power consumption state, and/or requested quality of service (QOS) for communication between at least one node 10 and at least one node 60.

This buffering capability of at least one node 10 may be communicated, at least in part, to at least one node 60 via one or more fields (not shown) that may be comprised in at least one request 200 and/or via one or more other communications (not shown) that may be made from at least one node 10 to at least one node 60. This buffering capability of at least one node 10 may be communicated, at least in part, to at least one node 60 in terms of, for example, a maximum time Tu that at least one node 10 is able to buffer one or more packets 204 that at least one node 10 may receive, while at least one node 60 is in the relatively lower power consumption state, that are intended for transmission to at least one node 60. One or more processors 12, circuitry 118, and/or NIC 120 may determine, at least in part, this maximum time Tu, based at least in part, upon the following relationship: Tu=Bu/Su, where Bu is the size (e.g., storage capability) of one or more buffers 22 and/or 26 dedicated to buffer one or packets 204 received by at least one node 10 that are intended to be transmitted to at least one node 60, and Su is the actual or expected incoming packet transmission rate to the one or more buffers 22 and/or 26 dedicated to buffer one or more packets 204. In the event, that multiple incoming channels or links feed into one or more buffers 22 and/or 26, Su may be set equal to the sum of the actual or expected incoming packet transmission rates of these incoming channels or links.

One or more processors 12', circuitry 118', and/or NIC 120' in at least one node 60 may determine, at least in part, its own respective packet buffering capability, if any, while at least node 60 is in the relatively lower power consumption state. This buffering capability of at least one node 60 may be determined, at least in part, in terms of, for example, a maximum time Td that at least one node 60 is able to buffer one or more packets that at least one node 60 may receive while at least one node 60 is in the relatively lower power consumption state.

If the at least one node 60 is unable to buffer one or more packets received by at least one node 60 while at least one node 60 is in the relatively lower power consumption state (e.g., one or more buffers 22' and/or 26' are not or cannot be dedicated to such task and/or at least one node 60 is otherwise incapable of carrying out such buffering while in the relatively lower power consumption state), one or more processors 12', circuitry 118', and/or NIC 120' may set Td equal to zero. In this case, one or more processors 12', circuitry 118', and/or NIC 120' may determine, at least in part, that the maximum latency time period Lmax that can be permitted to elapse, without resulting in at least partial loss of one or more packets 204 being buffered in at least one node 10, after the at least one node 60 has entered the relatively lower power state, before at least one node 60 should return to a relatively higher power consumption state in which at least one node 60 is capable of receiving one or more incoming packets, is Tu (i.e., Lmax=Tu). Accordingly, one or more processors 12', circuitry 118', and/or NIC 120' may select, at least in part, a relatively lower power consumption state that exhibits the maximum possible power savings consistent with a resume latency period (i.e., the time period between entry into the relatively lower power consumption state and return to the relatively higher power consumption state) Ld that is less than or equal to Lmax (i.e., Ld<=Lmax). In this relatively lower power consumption state, one or more components of at least one node 60 may be powered off or otherwise in one or more modes of operation that may consume relatively lower amounts of power.

In order to ensure adequate communication performance between at least one node 10 and at least one node 60, requested QOS for communication between at least one node 10 and at least one node 60 may be defined (e.g., as selected, at least in part, by a not shown human operator and/or protocol and/or application program-related considerations), at least in part, in terms of the maximum delay Dmax that may be permitted for packet transmission from at least one node 10 to at least one node 60 via one or more links 50. Information 202 may comprise and/or indicate, at least in part, Dmax and Ld, and these parameters (e.g., Dmax and Ld) may be communicated, at least in part, to one or more processors 12, circuitry 118, and/or NIC 120 by one or more processors 12', circuitry 118', and/or NIC 120' via one or more links 50.

In response, at least in part, to receipt, at least in part, of this information 202, one or more processors 12, circuitry 118, and/or NIC 120 may select, at least in part, at least one time period Tw to elapse (after at least one node has entered the relatively lower power consumption state) after the at least one node 10 receives, at least in part, at least one packet 204, prior to requesting at least one change of the at least one power consumption state of the at least one node 60 (e.g., from the relatively lower power consumption state to a relatively higher power consumption state (e.g., its present relatively higher power consumption state) in which the at least one node 60 may be capable of receiving and processing the at least one packet 204). This time period Tw may be equal to the first of the following conditions (1) or (2) to occur: (1) a time period set to Dmax−max (Ld, Ll) expires, or (2) the remaining amount of one or more buffers 22 and/or 26 (i.e., amount of one or more buffers 22 and/or 26 that is available and not filled with one or more packets 204) becomes less or equal to Su* max (Ld, Ll), where Ll is the communication link resume latency of one or more links 50. Depending upon the particular nature of and/or protocol or protocols utilized by one or more links 50, link resume latency Ll may either be communicated to at least one node 10 by at least one node 60 (or vice versa), or link resume latency Ll may be predetermined or otherwise already known by one or more of the link partners (i.e., by at least one node 10 and/or at least one node 60) and communicated among them as necessary. In this embodiment, condition (1) is set in order to permit the requested QOS to be met, while condition (2) is set to prevent loss of packet data that is being buffered in one or more buffers 22 and/or 26. Alternatively or additionally, in the case where the greater of Ld or Ll is equal to Lmax (i.e., max (Ld, Ll)=Lmax), Tw may expire may expire immediately after receipt of one or more packets 204 by at least one node 10.

After one or more processors 12, circuitry 118, and/or NIC 120 has calculated, at least in part, the value of Tw set by condition (1), one or more processors 12, circuitry 118, and/or NIC 120 may signal (via one or more links 50) at least one node 60 to enter the relatively lower power consumption state selected, at least in part, by one or more processors 12', circuitry 118', and/or NIC 120'. This may result, at least in part, in one or more processors 12', circuitry 118', and/or NIC 120' initiating and/or executing, at least in part, transition and/or entry, at least in part, of at least one node 60 into the relatively lower power consumption state from the present relatively higher power consumption state of at least one node 60. Thereafter, at least one node 60 may enter and remain in the relatively lower power consumption state, and one or more packets 204 received by at least one node 10 may be buffered in one or more buffers 22 and/or 26 in at least one node 10.

After Tw has elapsed, one or more processors 12, circuitry 118, and/or NIC 120 issue and transmit, at least in part, at least one wake up request 208 to one or more processors 12', circuitry 118', and/or NIC 120' via one or more links 50. This may result, at least in part, in one or more processors 12', circuitry 118', and/or NIC 120' initiating and/or executing, at least in part, transition and/or entry, at least in part, of at least one node 60 into a relatively higher power consumption state in which the at least one node 60 may receive and process one or more packets 204 that may be thereafter transmitted from at least node 10 to at least one node 60. Thereafter, at least one node 60 may enter and remain in the relatively higher power consumption state. After sending, at least in part, at least one wake up request 208 to at least one node 60, one or more processors 12, circuitry 118, and/or NIC 120 may wait until the larger of Ld or Ll has elapsed, and thereafter, may transmit one or more packets 210 (corresponding to one or more packet 204) buffered in one or more buffers 22 and/or 26 to at least one node 10.

Conversely, if at least one node 60 is able to buffer one or packets received by at least one node 60 while at least one node 60 is in the relatively lower power consumption state, one or more processors 12', circuitry 118', and/or NIC 120' in at least one node 60 may determine, at least in part, time Td such that Td may be equal to the lesser of either Bd divided by Su, or the difference of Tu minus Ll, multiplied by Sd, then divided by Su (i.e., Td=min {Bd,(Tu−Ll)*Sd}/Su), where Bd is the size (e.g., storage capability) of one or more buffers 22' and/or 26' dedicated to buffer one or packets received by at least one node 60 while at least one node 60 is in the relatively lower power consumption state, Ll is the communication link resume latency of one or more links 50, and Sd is the actual or expected incoming packet transmission rate to the one or more buffers 22' and/or 26' while at least one node 60 is in the relatively lower power consumption state. In this case, one or more processors 12', circuitry 118', and/or NIC 120' may determine, at least in part, that the maximum latency time period Lmax is Tu summed with Td (i.e., Lmax=Tu+Td). Accordingly, one or more processors 12', circuitry 118', and/or NIC 120' may select, at least in part, a relatively lower power consumption state that exhibits the maximum possible power savings consistent with a resume latency period (i.e., the time period between entry into the relatively lower power consumption state and return to the relatively higher power consumption state) Ld that is less than or equal to Lmax (i.e., Ld<=Lmax). In this relatively lower power consumption state, one or more components of at least one node 60 may be powered off or otherwise in one or more modes of operation that may consume relatively lower amounts of power.

In this case, information 202 may comprise and/or indicate, at least in part, Dmax and Ld, and these parameters (e.g., Dmax and Ld) may be communicated, at least in part, to one or more processors 12, circuitry 118, and/or NIC 120 by one or more processors 12', circuitry 118', and/or NIC 120' via one or more links 50.

In response, at least in part, to receipt, at least in part, of this information 202, one or more processors 12, circuitry 118, and/or NIC 120 may select, at least in part, at least one time period Tw. If Ll is greater than or equal to Ld (i.e., Ll>=Ld), Tw may be set in accordance, at least in part, with the conditions (1) or (2) discussed above in connection with the situation in which at least one node 60 is incapable of buffering one or more packets while at least one node is in the relatively lower power consumption state. After one or more processors 12, circuitry 118, and/or NIC 120 has calculated, at least in part, the value of Tw set by condition (1), one or more processors 12, circuitry 118, and/or NIC 120 may signal (via one or more links 50) at least one node 60 to enter the relatively lower power consumption state selected, at least in part, by one or more processors 12', circuitry 118', and/or NIC 120'. This may result, at least in part, in one or more processors 12', circuitry 118', and/or NIC 120' initiating and/or executing, at least in part, transition and/or entry, at least in part, of at least one node 60 into the relatively lower power consumption state from the present relatively higher power consumption state of at least one node 60. Thereafter, at least one node 60 may enter and remain in the relatively lower power consumption state, and one or more packets 204 received by at least one node 10 may be buffered in one or more buffers 22 and/or 26 in at least one node 10.

After Tw has elapsed, one or more processors 12, circuitry 118, and/or NIC 120 issue and transmit, at least in part, at least one wake up request 208 to one or more processors 12', circuitry 118', and/or NIC 120' via one or more links 50. This may result, at least in part, in one or more processors 12', circuitry 118', and/or NIC 120' initiating and/or executing, at least in part, transition and/or entry, at least in part, of at least one node 60 into a relatively higher power consumption state in which the at least one node 60 may receive and process one or more packets 204 that may be thereafter transmitted from at least node 10 to at least one node 60. Thereafter, at least one node 60 may enter and remain in the relatively higher power consumption state. After sending, at least in part, at least one wake up request 208 to at least one node 60, one or more processors 12, circuitry 118, and/or NIC 120 may wait until the larger of Ld or Ll has elapsed (while still continuing to buffer the one or more packets 204 received by at least one node 10), and thereafter, may transmit one or more packets 204 buffered in one or more buffers 22 and/or 26 to at least one node 10.

Conversely, if at least one node 60 is able to buffer one or packets received by at least one node 60 while at least one node 60 is in the relatively lower power consumption state, and Ll is less than Ld, Tw may be set equal to the first of the following conditions (3) or (4) to occur: (3) a time period equal to Dmax−max (Ld, Ll) expires, or (4) the remaining amount of one or more buffers 22, 26 (i.e., amount of one or more buffers 22 and/or 26 that is available and not filled with one or more packets 204) becomes less or equal to Su*(Ld−Td). In this embodiment, condition (3) is set in order to permit the requested QOS to be met, while condition (4) is set to prevent loss of packet data that is being buffered in one or more buffers 22 and/or 26. After one or more processors 12, circuitry 118, and/or NIC 120 has calculated, at least in part, the value of Tw set by condition (1), one or more processors 12, circuitry 118, and/or NIC 120 may signal (via one or more links 50) at least one node 60 to enter the relatively lower power consumption state selected, at least in part, by one or more processors 12', circuitry 118', and/or NIC 120'. This may result, at least in part, in one or more processors 12', circuitry 118', and/or NIC 120' initiating and/or executing, at least in part, transition and/or entry, at least in part, of at least one node 60 into the relatively lower power consumption state from the present relatively higher power consumption state of at least one node 60. Thereafter, at least one node 60 may enter and remain in the relatively lower power consumption state, and one or more packets 204 received by at least one node 10 may be buffered in one or more buffers 22 and/or 26 in at least one node 10. After Tw has elapsed, one or more processors 12, circuitry 118, and/or NIC 120 issue and transmit, at least in part, at least one wake up request 208 to one or more processors 12', circuitry 118', and/or NIC 120' via one or more links 50. This may result, at least in part, in one or more processors 12', circuitry 118', and/or NIC 120' initiating and/or executing, at least in part, transition and/or entry, at least in part, of at least one node 60 into a relatively higher power consumption state in which the at least one node 60 may receive and process one or more packets 204 that may be thereafter transmitted from at least node 10 to at least one node 60. Thereafter, at least one node 60 may enter and remain in the relatively higher power consumption state. After sending, at least in part, at least one wake up request 208 to at least one node 60, if Ll>=Ld, one or more processors 12, circuitry 118, and/or NIC 120 may wait until Ll has elapsed, and thereafter, may transmit (as one or more packets 210) all of one or more packets 204 buffered in one or more buffers 22 and/or 26 to at least one node 10. Conversely, after sending, at least in part, at least one wake up request 208, if Ll<Ld, one or more processors 12, circuitry 118, and/or NIC 120 may transmit (as one or more packets 210), after Ll has elapsed but before Ld has elapsed), an amount of one or more packets 204 that may be equal to Td *Su, while continuing the buffering of remaining and/or later received portions of one or more packets 204, and any such portions of the one or more packets 204 may be transmitted to at least one node 60 after Ld has elapsed. Advantageously, this may avoid loss of packet data buffered in at least one node 10.

Thus, in an embodiment, an apparatus is provided that may include circuitry to generate, at least in part, and/or receive, at least in part, at least one request that at least one network node generate, at least in part, information. The information may be to permit selection, at least in part, of (1) at least one power consumption state of the at least one network node, and (2) at least one time period. The at least one time period may be to elapse, after receipt by at least one other network node of at least one packet, prior to requesting at least one change in the at least one power consumption state. The at least one packet may be to be transmitted to the at least one network node.

Advantageously, in this embodiment, decisions whether and/or parameters involving change in power consumption states may be carried out, at least in part, in a collaborative and/or coordinated fashion between pairs of nodes in the network. Advantageously, this may synergistically increase the effectiveness of power management in the network of this embodiment, and decrease the likelihood that data transmitted between or among nodes in the network will be lost, compared to the prior art. Further advantageously, in this embodiment, if both nodes in a respective pair of nodes involved in the decision making are capable of buffering, while one of the nodes is in the relatively lower power consumption state, one or more packets intended for transmission to that one node, the embodiment may synergistically utilize the respective buffering capabilities of the pair as a single virtual buffer, thereby enhancing the power management effectiveness of this embodiment compared to the prior art.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Indeed, without departing from this embodiment, system 100 may include more or fewer than the elements shown in the Figures and described previously herein as being comprised system 100. Accordingly, the claims are intended to cover all such equivalents.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The invention claimed is:

1. A system comprising:
one or more processors; and
a memory having a plurality of instructions, which, when executed on the one or more processors, causes the system to:
determine a packet buffering capability of the system, the packet buffering capability indicative of an amount of packets that the system can buffer when under an available power consumption state;
determine, based on the packet buffering capability, a maximum latency time period to elapse without resulting in partial loss of one or more packets being buffered in the system,
negotiate a wake time period with a link partner, wherein the negotiation comprises generating a request for information from the link partner to cause the system to select the maximum latency time period to elapse,
determine, based on the packet buffering capability, an amount of power to consume for the available power consumption state;
cause entry into the available power consumption state using the determined amount of power, and
cause exit of the available power consumption state based on receipt of a wake signal from the link partner.

2. The system of claim 1, wherein the plurality of instructions further causes the system to determine the second time duration based at least in part on an amount of receive buffer.

3. The system of claim 1, wherein to negotiate the wake time period with the link partner comprises to receive a first time duration from the link partner.

4. The system of claim 3, wherein to negotiate the wake time period with the link partner further comprises to determine a second time duration from the link partner.

5. The system of claim 4, wherein to determine the second time duration from the link partner comprises to determine the second time duration from the link partner based, at least in part, the available power consumption state.

6. The system of claim 4, wherein to negotiate the wake time period with the link partner further comprises to cause transmission of the second time duration to the link partner.

7. One or more machine-readable storage media storing a plurality of instructions, which, when executed, cause a system to:
determine a packet buffering capability of the system, the packet buffering capability indicative of an amount of packets that the system can buffer when under an available power consumption state;

determine, based on the packet buffering capability, a maximum latency time period to elapse without resulting in partial loss of one or more packets being buffered in the system;

negotiate a wake time period with a link partner, wherein the negotiation comprises generating a request for information from the link partner to cause the system to select the maximum latency time period to elapse;

determine, based on the packet buffering capability, an amount of power to consume for the available power consumption state;

cause entry into the available power consumption state using the determined amount of power; and cause exit of the available power consumption state based on receipt of a wake signal from the link partner.

8. The one or more machine-readable storage media of claim 7, wherein the plurality of instructions further causes the system to determine the second time duration based at least in part on an amount of receive buffer.

9. The one or more machine-readable storage media of claim 7, wherein to negotiate the wake time period with the link partner comprises to receive a first time duration from the link partner.

10. The one or more machine-readable storage media of claim 9, wherein to negotiate the wake time period with the link partner further comprises to determine a second time duration from the link partner.

11. The one or more machine-readable storage media of claim 10, wherein to determine the second time duration from the link partner comprises to determine the second time duration from the link partner based, at least in part, the available power consumption state.

12. The one or more machine-readable storage media of claim 10, wherein to negotiate the wake time period with the link partner further comprises to cause transmission of the second time duration to the link partner.

13. A method comprising:

determining a packet buffering capability of the system, the packet buffering capability indicative of an amount of packets that the system can buffer when under an available power consumption state;

determining, based on the packet buffering capability, a maximum latency time period to elapse without resulting in partial loss of one or more packets being buffered in the system, negotiating a wake time period with a link partner, wherein negotiating comprises generating a request for information from the link partner to cause the system to select the maximum latency time period to elapse;

determine, based on the packet buffering capability, an amount of power to consume for the available power consumption state;

causing entry into the available power consumption state using the determined amount of power; and causing exit of the available power consumption state based on receipt of a wake signal from the link partner.

14. The method of claim 13, wherein the plurality of instructions further causes the system to determine the second time duration based at least in part on an amount of receive buffer.

15. The method of claim 13, wherein to negotiate the wake time period with the link partner comprises to receive a first time duration from the link partner.

16. The method of claim 15, wherein to negotiate the wake time period with the link partner further comprises to determine a second time duration from the link partner based, at least in part, the available power consumption state.

17. The method of claim 16, wherein to negotiate the wake time period with the link partner further comprises to cause transmission of the second time duration to the link partner.

* * * * *